United States Patent
Rasp et al.

(10) Patent No.: US 7,041,381 B1
(45) Date of Patent: May 9, 2006

(54) TRANSPARENT BIAXIALLY ORIENTED POLYOLEFIN FILM

(75) Inventors: Wolfgang Rasp, Prien Am Chiemsee (DE); Detlef Hütt, Heusweiler (DE)

(73) Assignee: Hoechst Trespaphan GmbH, Neunkirchen (DE)

( * ) Notice: Subject to any disclaimer, the term of this patent is extended or adjusted under 35 U.S.C. 154(b) by 0 days.

(21) Appl. No.: 09/913,118

(22) PCT Filed: Feb. 3, 2000

(86) PCT No.: PCT/EP00/00853

§ 371 (c)(1),
(2), (4) Date: Jan. 8, 2002

(87) PCT Pub. No.: WO00/47661

PCT Pub. Date: Aug. 17, 2000

(30) Foreign Application Priority Data

Feb. 10, 1999 (DE) .................................. 199 05 415

(51) Int. Cl.
*H01B 3/04* (2006.01)
*B32B 27/32* (2006.01)

(52) U.S. Cl. ...................................... 428/523; 524/449
(58) Field of Classification Search ................ 524/449; 428/523
See application file for complete search history.

(56) References Cited

U.S. PATENT DOCUMENTS

| | | | |
|---|---|---|---|
| 4,467,077 A | | 8/1984 | Meyer et al. ............... 524/449 |
| 6,019,831 A | * | 2/2000 | Schmidt et al. ............. 106/417 |
| H1955 H | * | 4/2001 | Middlesworth et al. ..... 524/427 |
| 6,214,917 B1 | * | 4/2001 | Linzmeier et al. .......... 524/430 |

FOREIGN PATENT DOCUMENTS

EP 0669365 A1 8/1995

* cited by examiner

*Primary Examiner*—Peter D. Mulcahy
(74) *Attorney, Agent, or Firm*—Dickinson Wright PLLC

(57) ABSTRACT

The invention relates to a transparent, single or multi-layer oriented polyolefin film which consists of at least one layer containing a sheet silicate with an irregular surface structure and no metal oxide coating.

23 Claims, No Drawings

TRANSPARENT BIAXIALLY ORIENTED POLYOLEFIN FILM

The invention relates to a laser-markable, transparent, oriented polyolefin film.

The prior art discloses processes for marking polymeric materials. Materials of this type contain a radiation-sensitive additive which causes discoloration of the material on exposure to radiation in certain wavelength ranges. These additives are known as laser pigments.

The prior art also discloses polyolefin films which are biaxially oriented for certain applications and generally have a thickness in the range from 3 to 100 μm. It is known to modify biaxially oriented films by means of suitable additives. Additives of this type may improve the friction, antistatic properties, thermal stability, appearance or other film properties. However, these additives must not impair the appearance in transparent films, i.e. in particular must not increase the haze or reduce the gloss.

The object of the present invention was therefore to provide a laser-markable, transparent, biaxially oriented polypropylene film. In particular, the film is to be markable by means of suitable processes with laser light of various wavelengths. The laser beam must not produce any through holes in the film. At the same time, the film is to have high transparency and a uniform appearance without fisheyes and bubbles.

This object is achieved by a transparent, single- or multilayer, oriented polyolefin film comprising at least one layer which comprises a layered silicate (referred to as 'the layer' below) which has an irregular surface structure and no coating of metal oxides. The sub-claims indicate preferred embodiments of the invention.

The layer of the film generally comprises at least 85% by weight, preferably from 90 to <100% by weight, in particular from 98 to <100% by weight, in each case based on the layer, of a polyolefin, preferably a propylene polymer.

Polyolefins are, for example, polyethylenes, polypropylenes, polybutylenes or copolymers of olefins having from two to eight carbon atoms, of which polyethylenes and polypropylenes are preferred.

In general, the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight respectively generally consists, if present, of ethylene and butylene. The data in % by weight are in each case based on the propylene polymer.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 1 to 10% by weight, preferably 2–5% by weight, based on the starting polymer.

The molecular weight distribution of the propylene polymer may vary within broad limits, depending on the area of application. The ratio between the weight average molecular weight $M_w$ and the number average molecular weight $M_n$ is generally between 1 and 15.

In a preferred embodiment of the film according to the invention, the ratio between the weight average molecular weight $M_w$ and the number average molecular weight $M_n$ is from 2 to 10, very particularly preferably from 2 to 6. Such a narrow molecular weight distribution of the propylene homopolymer of the layer is achieved, for example, by peroxidic degradation thereof or by preparation of the polypropylene by means of suitable metallocene catalysts.

In a preferred embodiment of the invention, the polypropylene employed is highly isotactic. For highly isotactic polypropylenes of this type, the chain isotacticity index, determined by $^{13}$C-NMR spectroscopy, of the n-heptane-insoluble content of the polypropylene is at least 95%, preferably from 96 to 99%.

It is essential to the invention that at least one layer of the film comprises a pigment based on layered silicate or layered silicates which has an irregular surface structure and no coating of metal oxides.

The layer generally comprises the pigment in an amount of from 0.01 to 4% by weight, preferably from 0.5 to 2.5% by weight, in particular from 0.8 to 1.5% by weight, based on the total weight of the film. It has been found that the concentration of pigment in % by weight depends on the respective layer thickness of the pigmented layer or layers. Thick layers exhibit the same effect at comparatively low concentrations as thinner layers do at higher concentrations. It is therefore preferred for the pigment concentration per area unit of the film to be in the range from 0.1 to 1.0 g/m², preferably from 0.1 to 0.7 g/m², in particular from 0.10 to 0.30 g/m². This area concentration is sufficient to ensure that the laser beam cannot pass through the film unhindered, but instead hits a pigment particle in the pigmented layer. This range for the area concentration applies irrespective of the film thickness, the layer thickness and the number of layers.

The layered silicate-based pigments are prepared from layered silicates having a platelet-shaped structure. Particularly suitable layered silicates are micas, of which muscovite, biotite, phlogopite, vermiculite and synthetic mica are particularly preferred. These starting materials, which are known per se, are also used for the preparation of pearlescent pigments. For the modification of the surface structure of the layered silicates, they are subjected to a dry grinding process as described in DE 44 41 223. The conditions during the grinding process are selected in such a way that the originally smooth surface structure of the layered silicates is substantially destroyed, so that the dry-ground pigments have a rough surface structure.

In a dry-grinding process, mica, for example, is introduced into a stirred ball mill and comminuted continuously by means of grinding media, for example made of corundum. The grinding conditions can be set by the person skilled in the art without further inventive step in such a way that the platelet-shaped mica pigments are comminuted, and the originally smooth surface is considerably roughened. The platelet-shaped character of the pigment structure is retained to a certain extent in the process. All known dry-grinding processes which can be correspondingly controlled are basically suitable.

The dry-ground pigments are subsequently classified preferably by air classification. Methods of this type are known. In accordance with the state of the art, the pigments are subsequently provided with a suitable coating of metal oxides or metal oxide hydrates. A high color intensity and high hiding power of the pigments is thereby achieved. These properties are particularly desirable for many applications.

As part of the present invention, it has been noted that it is advantageous for the dry-ground pigments not to be provided with a coating of this type. The oriented films comprising an uncoated laser pigment are advantageous, since the laser marking in the form of a white mark in a transparent film is more readily visible the less the film becomes hazy, as in the case of the use of a coated pigment. In addition, the desired transparency of the oriented film comprising uncoated pigment is, surprisingly, retained with virtually no change. On incorporation of coated pigments, the oriented film becomes very hazy.

It has been found that the grinding for the production of rough surfaces—but no coating with metal oxides—is essential in order to achieve a transparent, laser-markable, oriented film. It is assumed that the rough and uneven surface of the pigments that is produced by the grinding improves the adhesion of the polymers to the surface of the pigments in such a way that detachment and vacuole formation do not occur during the stretching process. Layered silicates which are coated with metal oxides after grinding cause the film to become very hazy.

It has furthermore been observed as part of the present invention that an optimum particle size for a balanced ratio of laser markability and optical properties of the film can easily be determined experimentally for a given laser pigment. The mean particle size here should not be chosen to be too small. With decreasing mean particle size, the haze of the film increases beyond an optimum mean particle size. It has furthermore been found that the laser markability is also dependent on this mean particle size. The sensitivity to the laser decreases if the wavelength of the laser light is more than a factor of 3 greater than the particle diameter. For example, the optimum mean particle size for dry-ground mica on use of a $CO_2$ laser is in the range from 4.5 to 5.5 µm, determined by image analysis under the electron microscope (SEM-IPS).

In addition to the laser pigments which are essential to the invention, the layer may also comprise conventional additives, such as neutralizers, stabilizers, antistatics and/or lubricants, in effective amounts in each case.

Preferred antistatics are alkali metal alkanesulfonates, polyether-modified, i.e., ethoxylated and/or propoxylated polydiorganosiloxanes (polydialkyl-siloxanes, polyalkylphenylsiloxanes and the like) and/or essentially straight-chain and saturated aliphatic, tertiary amines containing an aliphatic radical having 10 to 20 carbon atoms which are substituted by □-hydroxy-($C_1$–$C_4$)alkyl groups, where N,N-bis(2-hydroxyethyl)alkylamines having 10 to 20 carbon atoms, preferably 12 to 18 carbon atoms, in the alkyl radical are particularly suitable. The effective amount of antistatic is in the range from about 0.05 to 0.5% by weight. Glycerol monostearate is also preferably employed as antistatic, in an amount from 0.03% to 0.5%.

Lubricants are higher aliphatic acid amides, higher aliphatic acid esters, waxes and metal soaps, and polydimethylsiloxanes. The effective amount of lubricant is in the range from 0.01 to 3% by weight, preferably from 0.02 to 1% by weight. Particularly suitable is the addition of higher aliphatic acid amides in the range from 0.01 to 0.25% by weight in the layer. A particularly suitable aliphatic acid amide is erucamide. The addition of poly-dimethylsiloxanes is preferred in the range from 0.02 to 2.0% by weight, in particular polydimethylsiloxanes having a viscosity from 5000 to 1,000,000 $mm^2$/s.

Stabilizers which can be employed are the conventional compounds having a stabilizing action for polymers of ethylene, propylene and other □-olefin polymers. Their added amount is between 0.05 and 2% by weight. Particularly suitable are phenolic stabilizers, alkali metal or alkaline earth metal stearates and/or alkali metal or alkaline earth metal carbonates. Phenolic stabilizers are preferred in an amount from 0.1 to 0.6% by weight, in particular from 0.15 to 0.3% by weight, and having a molecular weight of greater than about 500 g/mol. Pentaerythritol tetrakis-3-(3,5-di-tert-butyl-4-hydroxyphenyl)propionate and 1,3,5-trimethyl-2,4,6-tris(3,5-di-tert-butyl-4-hydroxybenzyl)benzene are particularly advantageous.

Neutralizers are preferably dihydrotalcite, calcium stearate and/or calcium carbonate having a mean particle size of at most 0.7 □m, an absolute particle size of less than 10 µm and a specific surface area of at least 40 $m^2$/g.

The above data in % in each case relate to the weight of the layer.

In a preferred embodiment, the polyolefin film according to the invention comprises top layer(s) of polymers of □-olefins having 2 to 10 carbon atoms applied to one or both sides of the laser pigment-containing layer or an interlayer.

Examples of □-olefinic polymers of this type of the top layer(s) are
propylene homopolymer
a copolymer of
ethylene and propylene or
ethylene and 1-butylene or
propylene and 1-butylene or
a terpolymer of
ethylene and propylene and 1-butylene or
a mixture of two or more of said homopolymers, copolymers and terpolymers or
a blend of two or more of said homopolymers, copolymers and terpolymers, if desired mixed with one or more of said homopolymers, copolymers and terpolymers,
where particular preference is given to
random ethylene-propylene copolymers having
an ethylene content of from 1 to 10% by weight, preferably from 2.5 to 8% by weight, or
random propylene-1-butylene copolymers having
a butylene content of from 2 to 25% by weight, preferably from 4 to 20% by weight,
in each case based on the total weight of the copolymer, or
random ethylene-propylene-1-butylene terpolymers having
an ethylene content of from 1 to 10% by weight, preferably from 2 to 6% by weight, and
a 1-butylene content of from 2 to 20% by weight, preferably from 4 to 20% by weight,
in each case based on the total weight of the terpolymer, or
a blend of an ethylene-propylene-1-butylene terpolymer and a propylene-1-butylene copolymer
having an ethylene content of from 0.1 to 7% by weight and a propylene content of from 50 to 90% by weight and a 1-butylene content of from 10 to 40% by weight,
in each case based on the total weight of the polymer blend.

The above-described copolymers and/or terpolymers employed in the top layer(s) generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the above-mentioned melt flow indices are measured at 230° C. and a force of 21.6 N (DIN 53 735).

If desired, all the above-described top-layer polymers may be peroxidically degraded in the same manner as described above for the layer, basically using the same peroxides. The degradation factor for the top-layer polymers is generally in the range from 3 to 15, preferably from 6 to 10.

If desired, the additives described above for the layer, such as antistatics, neutralizers, lubricants, and/or stabilizers, and, if desired, additionally anti-blocking agents, can be added to the top layer(s). The data in % by weight then relate correspondingly to the weight of the top layer.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates and the like, preference being given to benzoguanamine-formaldehyde polymers, silicon dioxide and calcium carbonate. The effective amount of antiblocking agent is in the range from 0.1 to 2% by weight, preferably from 0.1 to 0.8% by weight. The mean particle size is between 1 and 6 µm, in particular 2 and 5 µm, with particles having a spherical shape, as described in EP-A-0 236 945 and DE-A-38 01 535, being particularly suitable.

The film according to the invention comprises at least one layer comprising laser pigments. This pigment-containing layer is preferably the base layer of a three- or five-layered embodiment. If desired, the pigment-containing layer may also be the interlayer of a four- or five-layered embodiment. In a further embodiment, pigments are incorporated both into the base layer and into the interlayer. A further variant of the invention is a structure in which the top layer, in addition to the pigment-containing base layer and/or interlayer, also comprises laser pigments.

The thickness of the top layer(s) is greater than 0.1 µm and is preferably in the range from 0.3 to 3 µm, in particular from 0.4 to 1.5 µm, where top layers on both sides may have identical or different thicknesses.

The interlayer(s) may consist of the □-olefinic polymers described for the base layer. The interlayer(s) may comprise the conventional additives described for the individual layers, such as antistatics, neutralizers, lubricants and/or stabilizers, and, if desired, additionally antiblocking agents. The thickness of the interlayer(s) is greater than 0.3 µm and is preferably in the range from 1.0 to 15 µm, in particular from 1.5 to 10 µm.

The total thickness of the polyolefin film according to the invention can vary within broad limits and depends on the intended use. It is preferably from 4 to 60 µm, in particular from 5 to 50 µm, preferably from 10 to 35 µm, the layer making up about 40 to 100% of the total film thickness.

The invention furthermore relates to a process for the production of the polyolefin film according to the invention by the coextrusion process, which is known per se.

This process is carried out by coextruding the melts corresponding to the individual layers of the film through a flat-film die, taking off the resultant film over one or more roll(s) for solidification, subsequently stretching (orienting) the film, heat-setting the stretched film and, if desired, corona- or heat-treating the surface layer intended for the treatment.

The biaxial stretching (orientation) is generally carried out sequentially or simultaneously. The sequential stretching is generally consecutively, with consecutive biaxial stretching, in which stretching is firstly carried out longitudinally (in the machine direction) and then transversely (perpendicular to the machine direction), being preferred. The simultaneous stretching can be carried out by the flat film process or by the blowing process. The further description of the film production relates to the example of flat film extrusion with subsequent sequential stretching.

Firstly, as is conventional in the coextrusion process, the polymer or polymer mixture of the individual layers is compressed and liquefied in an extruder, it being possible for the laser pigments and any other additives optionally added already to be present in the polymer or polymer mixture. The melts are then forced simultaneously through a flat-film die (slot die), and the extruded multilayer film is taken off on one or more take-off rolls, during which it cools and solidifies.

The film obtained in this way is then stretched longitudinally and transversely to the extrusion direction, which results in alignment of the molecule chains. The longitudinal stretching is advantageously carried out with the aid of two rolls running at different speeds corresponding to the target stretching ratio, and the transverse stretching is advantageously carried out with the aid of an appropriate tenter frame. The longitudinal stretching ratios are in the range from 4 to 8, preferably from 5 to 6. The transverse stretching ratios are in the range from 5 to 10, preferably from 7 to 9.

The stretching of the film is followed by heat-setting (heat treatment) thereof, in which the film is held at a temperature from 100 to 160° C. for from about 0.1 to 10 seconds. The film is subsequently wound up in a conventional manner by means of a wind-up unit.

It has proven particularly favorable to keep the take-off roll or rolls by means of which the extruded film is cooled and solidified at a temperature from 10 to 100° C., preferably from 20 to 50° C., by means of a heating and cooling circuit.

The temperatures at which longitudinal and transverse stretching are carried out can vary in a relatively broad range and depend on the desired properties of the film. In general, the longitudinal stretching is preferably carried out at from 80 to 150° C. and the transverse stretching is preferably carried out at from 120 to 170° C.

After the biaxial stretching, one or both surface(s) of the film is/are preferably corona- or flame-treated by one of the known methods. The treatment intensity is generally in the range from 37 to 50 mN/m, preferably from 39 to 45 mN/m.

The surface treatment of the film is described here using the example of corona treatment.

In the corona treatment, an advantageous procedure is to pass the film between two conductor elements serving as electrodes, with such a high voltage, usually an alternating voltage (from about 5 to 20 kV and from about 5 to 30 kHz), being applied between the electrodes that spray or corona discharges are able to occur. Due to the spray or corona discharge, the air above the film surface ionizes and reacts with the molecules of the film surface, causing formation of polar inclusions in the essentially non-polar polymer matrix.

The film according to the invention can be laser-inscribed by processes known per se. For this purpose, the film is introduced into the beam path of a pulsed laser, preferably a pulsed $CO_2$ laser or an Nd:YAG or excimer laser. The choice of laser depends on the wavelength at which the pigment has the highest possible absorption cross section. The shade and color intensity of the marking depend on the irradiation time and the energy density of the radiation.

The raw materials and films were characterized using the following measurement methods:

Melt Flow Index

The melt flow index was measured in accordance with DIN 53 735 at a load of 21.6 N and 230° C.

Mean Particle Size

The mean particle size was determined by image analysis. For this purpose, a sample is dispersed in water in order to separate the particles and is applied to a glass slide. The sample is subsequently dried and examined under the scanning electron microscope. For this purpose, the individual particles are visualized as gray shade image by means of a suitable setting of brightness and contrast. Over an area of 10 mm$^2$, the respective area of the separated particles is measured, and the particle diameter is given as the diameter of a circle of equal area. These measure-ment values are classified by size ranges and indicate the distribution of the particle size. The mean particle diameter is determined as the mean of the distribution curve.

Melting Point

DSC measurement, maximum of the melting curve, heating rate 20° C./min.

Haze

The haze of the film was measured in accordance with ASTM-D 1003-52.

Gloss

The gloss was determined in accordance with DIN 67 530. The reflector value was measured as an optical parameter for the surface of a film. In accordance with the standards ASTM-D 523-78 and ISO 2813, the angle of incidence was set at 60°. A light beam hits the planar test surface at the set angle of incidence and is reflected or scattered thereby. The light beams incident on the photoelectronic receiver are displayed as a proportional electrical quantity. The measurement value is dimensionless and must be specified together with the angle of incidence.

Molecular Weight Determination

The mean molecular weights Mw and Mn and the mean molecular weight dispersity Mw/Mn were determined in accordance with DIN 55 672, Part 1, by means of gel permeation chromatography. Instead of THF, ortho-dichlorobenzene was used as eluent. Since the olefinic polymers to be investigated are insoluble at room temperature, the entire measurement is carried out at elevated temperature ($\approx$135° C.).

The invention is explained below by working examples.

Preparation of Dry-Ground Mica:

Naturally occurring mica having a platelet diameter of about 2 cm was dry-ground in an industrial stirred ball mill with corundum grinding elements having a diameter of 5 mm. The ground material was subsequently classified in an air classifier in such a way that a fraction having a mean particle diameter of about 5 μm and a cut-off of 15 μm was obtained. The pigments obtained in this way were incorporated directly, i.e. without further metal oxide coating, into propylene homopolymer having a melting point of 166° C. and a melt flow index of 3.4 g/10 min. In this way, a masterbatch comprising 60% by weight of propylene homopolymer and 40% by weight of dry-ground, metal oxide-free mica (referred to as laser pigment below) was obtained.

EXAMPLE 1

A transparent five-layered film having a symmetrical structure and a total thickness of 30 μm was produced by coextrusion followed by stepwise orientation in the longitudinal and transverse directions. The top layers each had a thickness of 0.7 μm. The interlayers each had a thickness of 5 μm.

Base layer:
96.74% by weight of isotactic propylene homopolymer having a melting point of 166° C. and a melt flow index of 3.4 g/10 min
3.00% by weight of the above-described masterbatch comprising 60% by weight of propylene homopolymer and 40% by weight of the laser pigment, corresponding to a content of 1.2% by weight of laser pigment, based on the layer,
0.14% by weight of Armostat
0.12% by weight of erucamide
Interlayers:
100% by weight of isotactic propylene homopolymer having a melting point of 166° C. and a melt flow index of 3.4 g/10 min
Top layers:
98.8% by weight of random ethylene-propylene-butylene terpolymer having an ethylene content of 3% by weight and a butylene content of 7% by weight (remainder propylene)
0.2% by weight of SiO$_2$ as antiblocking agent, having a mean particle size of 2 μm The production conditions in the individual process steps were as follows:

| Extrusion: | Temperatures | Base layer: | 260° C. |
|---|---|---|---|
| | | Interlayers: | 255° C. |
| | | Top layers: | 240° C. |
| | Temperature of the take-off rolls: | | 20° C. |
| Longitudinal stretching: | Temperature: | | 110° C. |
| | Longitudinal stretching ratio: | | 5.5 |
| Transverse stretching: | Temperature: | | 160° C. |
| | Transverse stretching ratio: | | 9 |
| Setting: | Temperature: | | 150° C. |
| | Convergence: | | 5% |

EXAMPLE 2

A film was produced as described in Example 1. In contrast to Example 1, however, the film contained no interlayers. The film thickness of the three-layered embodiment was therefore only 20 μm. The remainder of the composition and the production conditions were unchanged compared with Example 1.

EXAMPLE 3

A film was produced as described in Example 1. In contrast to Example 1, the base layer contained no laser pigment. Instead, laser pigment in an amount of 2.2% by weight, based on the weight of the layer, was incorporated into the interlayer via the 40% masterbatch (i.e. 5.6% of masterbatch). The remainder of the composition and the production conditions were unchanged compared with Example 1.

EXAMPLE 4

A film was produced as described in Example 1. In contrast to Example 1, 1.95% by weight of the 40% masterbatch, corresponding to a content of 0.78% by weight, based on the weight of the base layer, were incorporated into the base layer. In addition, 1.95% by weight of the 40% masterbatch were incorporated into the respective interlayers, corresponding to a content of 0.78% by weight, based on the weight of the respective inter-layer. The remainder of the composition and the production conditions were unchanged compared with Example 1.

density of from 5 to 7 J/cm² and marked with a bar code. The results from the examples and comparative examples are shown in the table below.

TABLE

|  | Appearance | Haze in accordance with ASTM 1003-52 | Gloss in accordance with DIN 67 530 at 60° | Laser marking CO₂ laser | Laser pigment |
|---|---|---|---|---|---|
| E1 | ++ | 8 | 140 | +++ | 1.2% by wt. in the base layer |
| E2 | +++ | 5 | 145 | +++ | 1.2% by wt. in the base layer |
| E3 | + | 12 | 120 | +++ | 2.2% by wt. in the interlayer |
|  |  |  |  |  | No interlayer |
| E4 | +++ | 7 | 140 | +++ | 0.78% by wt. in the base layer and interlayer |
| E5 | +++ | 4 | 145 | ++ | 0.6% by wt. in the base layer |
| CE1 | — | 15–20 | 120–140 | +++ | Wet grinding |
|  | Spots, microvoiding | irregular | irregular |  |  |
| CE2 | — | 20 | 140 | +++ | Metal oxide coating after grinding |
|  | Microvoiding |  |  |  |  |

E = Example,
CE = Comparative Example

EXAMPLE 5

A film was produced as described in Example 2, with the base layer now comprising only 0.6% by weight of the laser pigment. The remainder of the composition and the production conditions were unchanged compared with Example 2.

COMPARATIVE EXAMPLE 1

A film was produced as described in Example 1. In contrast to Example 1, the film now contained a wet-ground mica having a smooth platelet-shaped structure instead of the dry-ground mica having a rough surface and no metal oxide coating. For the wet grinding, a moist suspension of the platelet-shaped mica is ground between two surfaces moved relative to one another. The mica was principally comminuted by shear forces here, with the original platelet shape being substantially retained. The mean particle diameter of the wet-ground mica was likewise about 5 µm, with a cut-off of 15 µm. The remainder of the composition and the production conditions were unchanged compared with Example 1.

COMPARATIVE EXAMPLE 2

A film was produced as described in Example 1. In contrast to Example 1, the film now contained a dry-ground mica with TiO₂ coating instead of the dry-ground mica having a rough surface and no metal oxide coating. For this purpose, the mica was suspended in water after dry grinding (as described above) and warmed to about 75° C. with stirring. A pH of 2.2 is set by means of 10% hydrochloric acid. TiCl₄ solution was subsequently added to the mica suspension, with the pH being kept constant by means of 32% sodium hydroxide solution. When the TiCl₄ solution has been added, a pH of 7 is set using sodium hydroxide solution, and stirring is continued. The mixture is subsequently washed chloride-free with water and dried at 110° C. The pigments were subsequently ignited at about 700° C. for 1 hour. The remainder of the composition and the production conditions were unchanged compared with Example 1.

The films produced in accordance with the examples and comparative examples were irradiated for 0.2 µsec by means of a CO₂ laser at a wavelength of 9.3 µm and an energy density of from 5 to 7 J/cm² and marked with a bar code. The results from the examples and comparative examples are shown in the table below.

The invention claimed is:

1. Transparent, single- or multilayered, oriented polypropylene film comprising at least one layer, characterized in that said at least one layer comprises a layered dry-ground silicate without a coating of metal oxides which has an irregular surface structure, wherein the amount of said layered silicate is between 0.01 to 4% by weight, based on the total weight of the film, said film being at least 85% by weight polypropylene, said film being laser markable.

2. Polyolefin film according to claim 1, characterized in that the said layered silicate is platelet-shaped.

3. Polyolefin film according to claim 1, characterized in that said dry-grinding process is carried out in such a way that a rough surface structure is produced.

4. Polyolefin film according to claim 1, characterized in that said dry-grinding of said silicate layer results in a ground layered silicate, said ground layered silicate being non-glossy.

5. Polyolefin film according to claim 1, characterized in that the layered silicate is a mica taken from the group consisting of muscovite, biotite, phlogopite, vermiculite or synthetic mica.

6. Polyolefin film according to claim 5, characterized in that the mica has been ignited.

7. Polyolefin film according to claim 1, characterized in that the dry grinding process produces ground silicate particles having a mean particle size, said mean particle size being from 1 to 10 µm.

8. Polyolefin film according to claim 1, characterized in that the layered silicate is in the layer selected from the group consisting of the base layer, the interlayer and the top layer.

9. Polyolefin film according to claim 1, characterized in that the layered silicate is present in the film in a concentration of from 0.1 to 1.0 g/m².

10. Polyolefin film according to claim 1, characterized in that the film has a thickness of from 3 to 50 µm.

11. Process for the production of a polyolefin film according to claim 1, characterized in that the orientation in the longitudinal direction is carried out with a longitudinal stretching ratio of from 3:1 to 9:1 and the orientation in the transverse direction is carried out with a transverse stretching ratio of from 4:1 to 10:1.

12. Polyolefin film according to claim 1, characterized in that the dry grinding process produces ground silicate particles having a mean particle size, said mean particle size being from 2 to 8 μm.

13. Polyolefin film according to claim 1, characterized in that the layered silicate is in the base layer, the interlayer, and the top layer.

14. Polyolefin film according to claim 1, characterized in that the layered silicate is in the base layer and the interlayer.

15. Polyolefin film according to claim 1, characterized in that the layered silicate is in the base layer and the top layer.

16. Polyolefin film according to claim 1, characterized in that the layered silicate is in the interlayer and the top layer.

17. Process for the production of a polyolefin film according to claim 1, characterized in that the orientation in the transverse direction is carried out with a transverse stretching ratio of from 4:1 to 10:1.

18. Polyolefin film according to claim 1, characterized in that the layered silicate is present in the film in a concentration from 0.1 to 0.7 g/m$^2$.

19. Polyolefin film according to claim 1, characterized in that the layered silicate is present in the film in a concentration of from 0.10 to 0.30 g/m$^2$.

20. Polyolefin film according to claim 1, characterized in that the film has a thickness of from 5 to 50 μm.

21. A method of marking a polypropylene film comprising the steps of:

forming an oriented polypropylene film comprising at least one layer, characterized in that said at least one layer of said film comprises a layered, dry-ground silicate without a coating of metal oxides which has an irregular surface structure, wherein the amount of said layered silicate is between 0.01 to 4% by weight, based on the total weight of the film, said film being at least 85% by weight polypropylene; and marking said oriented polypropylene film by use of a laser, said laser being selected from the group consisting of a CO$_2$ laser, an Nd:YAG laser, and an excimer laser.

22. A method for forming and applying a marked polypropylene film to a package, the method comprising the steps of:

forming an oriented polypropylene film comprising at least one layer, characterized in that said at least one layer of said film comprises a layered, dry-ground silicate without a coating of metal oxides which has an irregular surface structure, wherein the amount of said layered silicate is between 0.01 to 4% by weight, based on the total weight of the film, said film being at least 85% by weight polypropylene; and marking said oriented polypropylene film by use of a laser, said laser being selected from the group consisting of a CO$_2$ laser, an Nd:YAG laser, and an excimer laser; and applying said formed oriented polypropylene film to the package.

23. The film of claim 1, wherein said silicate is uncoated.

* * * * *